United States Patent
Schatzberg et al.

(10) Patent No.: US 8,818,420 B2
(45) Date of Patent: Aug. 26, 2014

(54) ROTATION-TOLERANT DEVICES AND SCHEMES FOR PEDESTRIAN-DEAD-RECKONING (PDR) LOCATION DETERMINATION

(71) Applicant: Intel Corporation, Santa Clara, CA (US)

(72) Inventors: Uri Schatzberg, kiryat ono (IL); Yuval Amizur, Kfar-Saba (IL); Leor Banin, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/630,696

(22) Filed: Sep. 28, 2012

(65) Prior Publication Data

US 2014/0094200 A1    Apr. 3, 2014

(51) Int. Cl.
*H04W 24/00* (2009.01)
(52) U.S. Cl.
USPC ....................................................... 455/456.6
(58) Field of Classification Search
CPC ................................. H04W 4/02; H04W 4/04
USPC ........... 455/456.1, 456.2, 456.3, 456.5, 456.6
See application file for complete search history.

(56) References Cited

U.S. PATENT DOCUMENTS

| | | | |
|---|---|---|---|
| 2003/0003925 A1* | 1/2003 | Suzuki | 455/456 |
| 2006/0044268 A1 | 3/2006 | Robin et al. | |
| 2006/0261257 A1* | 11/2006 | Hwang | 250/216 |
| 2009/0197615 A1* | 8/2009 | Kim et al. | 455/456.1 |
| 2009/0221298 A1* | 9/2009 | Hanner | 455/456.1 |
| 2011/0275408 A1 | 11/2011 | Kulik | |
| 2012/0057064 A1 | 3/2012 | Gardiner et al. | |
| 2013/0053064 A1* | 2/2013 | Park et al. | 455/456.1 |
| 2013/0196681 A1* | 8/2013 | Poduri et al. | 455/456.1 |

FOREIGN PATENT DOCUMENTS

| | | |
|---|---|---|
| EP | 2280331 | 2/2011 |
| EP | 2450872 | 5/2012 |
| WO | PCTUS2012041602 | 6/2012 |

OTHER PUBLICATIONS

International Search Report and Written Opinion, mail date Oct. 18, 2013, PCT/ISA/210, PCT/ISA/220, PCT/ISA/237, total of 10 pages.

* cited by examiner

*Primary Examiner* — Christopher M Brandt
(74) *Attorney, Agent, or Firm* — Pillsbury Winthrop Shaw Pittman LLP (57) ABSTRACT

Devices, systems, and methods are directed to the determination of current location information of a wireless communication device. Such devices, systems, and methods include a plurality of sensor elements configured to provide orientation parameter information, velocity and/or acceleration parameter information, and directional heading parameter information; a camera mechanism configured to capture images at predetermined intervals of a user's body as the user handles the wireless communication device; orientation logic configured to determine orientation change information attributable to the user's handling, based on the captured images, and provide orientation correction information; and location estimation logic configured to provide current location information based on previous location information, the velocity and/or acceleration parameter information, the directional heading parameter information and/or the orientation parameter information, and the orientation correction information.

20 Claims, 5 Drawing Sheets

ROTATION-TOLERANT DEVICES AND SCHEMES FOR PEDESTRIAN-DEAD-RECKONING (PDR) LOCATION DETERMINATION

TECHNICAL FIELD

This disclosure relates generally to the field of wireless communications, and in particular, to wireless navigation systems and methods.

BACKGROUND

Given the development of various satellite-based technologies, such as, global positioning systems (GPSs), and global-navigation-satellite-systems (GNSS), outdoor navigation systems have become very popular and incorporated in a variety of consumer products. Indeed, many portable electronic devices exploit such technologies to determine their own location and assist in directional guidance.

Recently, there has been considerable interest in indoor navigation and directional guidance. However, satellite-based systems are not as dependable for indoor applications, as indoor environments contain structural features that may compromise the effective reception of satellite signals.

To this end, electronic devices sometimes employ inertial navigation technologies to determine their location while in indoor environments. Such technologies may include one or more inertial navigation sensors and magnetometer sensors which, in combination, provide position, velocity, acceleration, and directional heading information. For example, such technologies may incorporate movement sensors (e.g., accelerometers) that detect movement of the devices and provide movement-related information, such as, velocity and/or acceleration; incorporate orientation sensors (e.g., gyroscopes) that provide information relating to the orientation of the devices; and incorporate directional sensors (e.g., magnetometers and/or compasses) that provide heading direction information.

Such technologies may then apply the sensor information to a variety of position estimation techniques, such as, for example, Pedestrian-Dead-Reckoning (PDR) estimation techniques, to approximate or establish a current position by taking into account previous position, direction, and travel distance information.

DETAILED DESCRIPTION

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, what is proposed is a wireless device capable of determining its current location information. The wireless device includes a plurality of sensor elements configured to provide orientation parameter information, velocity and/or acceleration parameter information, and directional heading parameter information; a camera mechanism configured to capture images at predetermined intervals of a user's body as the user handles the wireless communication device; orientation logic configured to determine orientation change information attributable to the user's handling, based on the captured images, and provide orientation correction information; and location estimation logic configured to provide current location information based on previous location information, the velocity and/or acceleration parameter information, the directional heading parameter information and/or the orientation parameter information, and the orientation correction information.

In another embodiment, a method is proposed that determines the current location information of a wireless device. The method includes determining, via sensor elements, orientation parameter information, velocity and/or acceleration parameter information, and directional heading parameter information; capturing images at predetermined intervals of a user's body as the user handles the wireless communication device; determining orientation change information attributable to the user's handling, based on the captured images; providing orientation correction information based on the orientation change information; and providing the current location information based on previous location information, the velocity and/or acceleration parameter information, the directional heading parameter information and/or the orientation parameter information, and the orientation correction information.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Figure 4:
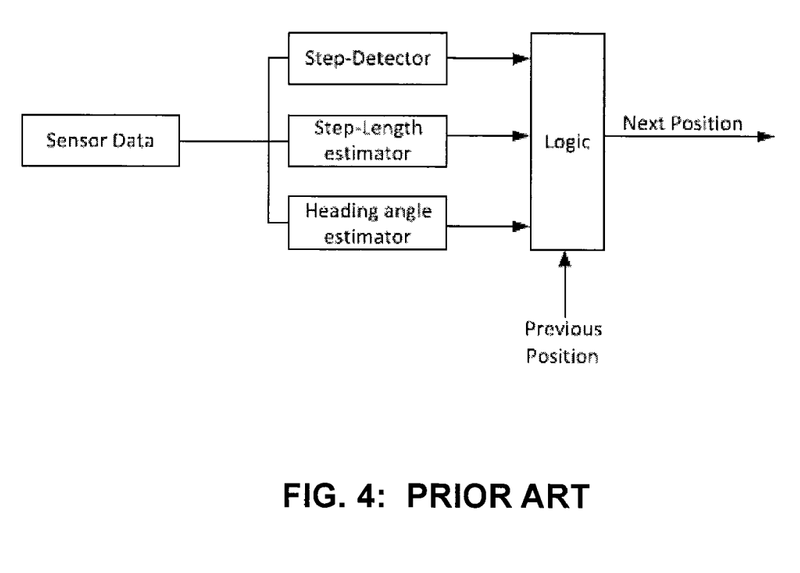
FIG. 4 depicts a schematic functional block diagram of a conventional PDR scheme.

With regard to PDR navigation estimation techniques, as noted above, these techniques rely on sensor information to estimate or establish the current position of an electronic device by factoring the previous position, direction, and distance of travel. In particular, as depicted in FIG. 4, conventional PDR includes a step-detector, which utilizes accelerometer sensor inputs to detect steps based on a predetermined threshold, a step-length estimator, which utilizes user-specific calibration and accelerometer sensor samples to estimate step or stride lengths, and heading angle estimation that employs magnetometer sensor and/or gyroscope sensor measurements to estimate the direction of movement. It should be noted that any change in orientation of magnetometer and/or gyroscope sensors, is deemed to be a change in trajectory. PDR then processes this information along with the previously calculated position in accordance to one or more algorithms to estimate the current position.

Such techniques appear to be effective for electronic devices that are fixed or strapped to a user's body. However, for hand-held wireless communication devices, the inventors have observed that such techniques are susceptible to significant errors. As noted above, such techniques require that the gyroscopic and/or magnetometer sensors have a constant, fixed orientation throughout the travel, as they are intolerant to rotational deviations from the fixed sensor orientation. In other words, rotational deviations will generally be deemed as being a change in trajectory and processed as such. Thus, users relying on hand-held wireless communication devices for navigation purposed, especially in indoor environments, must be careful to not rotate the hand-held devices, as any deviation may result in cumulative and significant positioning errors.

With this said, what is proposed is a positioning system and method that provides accurate location information of a wireless communication devices, whether in indoor or outdoor environments, that is tolerant to rotation deviations due to user instability in holding wireless communication devices.

Figure 1:
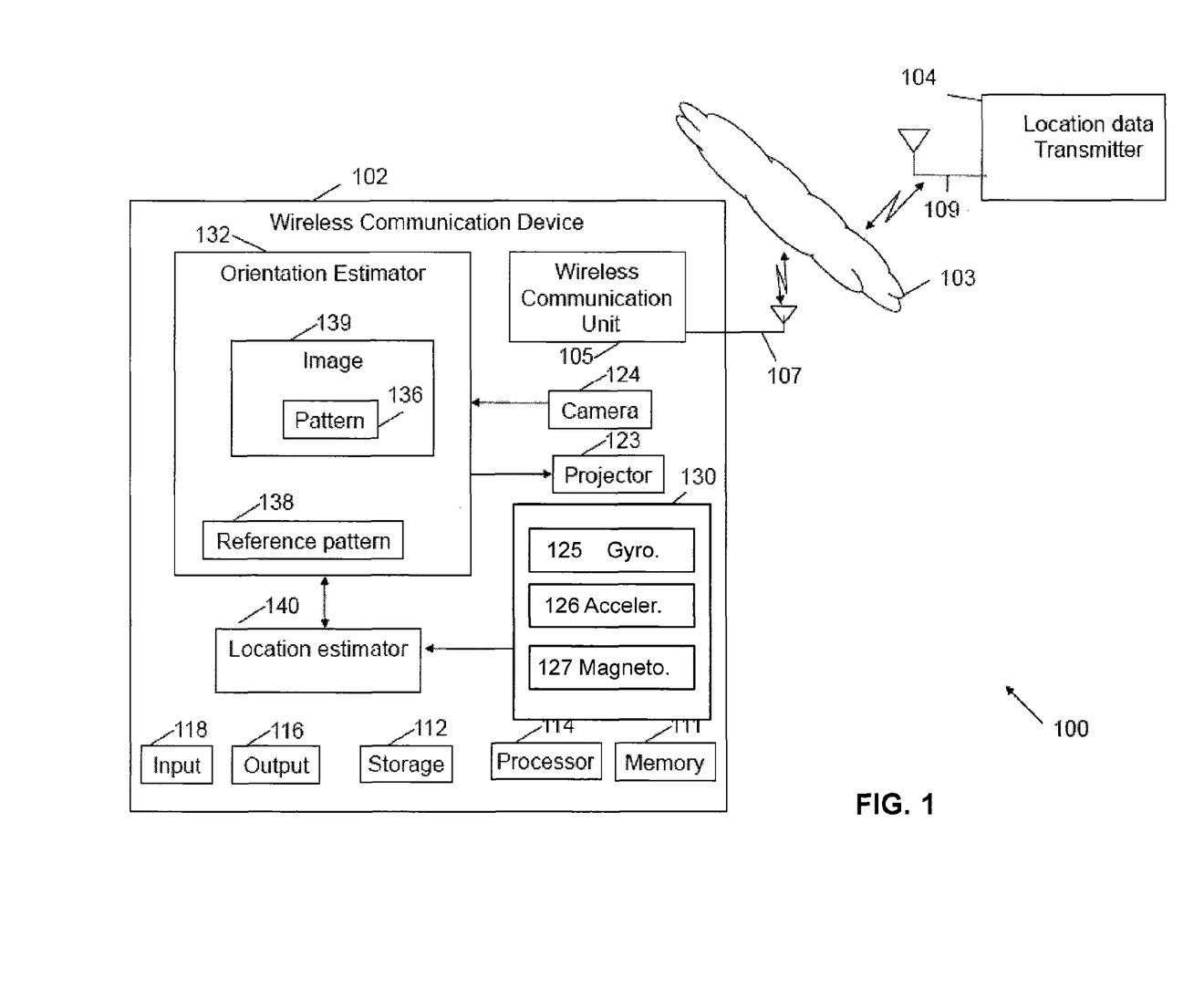
FIG. 1 depicts a schematic functional block diagram of a wireless location system, in accordance with various aspects and principles of the present disclosure.

To this end, FIG. 1 depicts a non-limiting example of a wireless location system 100, in accordance with various aspects and principles of the present disclosure. System 100 comprises wireless communication device 102 capable of transmitting and receiving content, data, information and/or signals over one or more suitable wireless communication media 103. Wireless communication media 103 may operate under one or more wireless communication standards/protocols, such as, for example, GPS, GNSS, GPRS, NFC, Wi-Fi, WiMax, WWAN, WLAN, WPAN, Bluetooth, GSM, CDMA, GPRS, 3G or 4G, LTE, Wireless USB, etc. to communicate with one or more location data transmitters 104 that may provide wireless communication signals including raw location data via one or more antennas 109. For example, location data transmitters 104 may include one or more location data origin transmitters, e.g., GNSS satellites to generate GNSS-based raw location data.

It will be appreciated that wireless communication device 102 may take the form of, or may be included as part of, a mobile or portable device, for example, a mobile computer, a laptop computer, a notebook computer, a tablet computer, a handheld computer, a PDA device, a handheld PDA device, an on-board device, an off-board device, a hybrid device (e.g., combining cellular phone functionalities with PDA device functionalities), a consumer device, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, or the like.

Moreover, wireless communication device 102 may comprise a combination of components suitable for communicating, i.e., transmitting and/or receiving, wireless communication signals over wireless media 103. In particular, device 102 may include a wireless communication unit 105 to communicate via one or more antennas 107. Antennas 107 may include any type of antenna suitable for transmitting and/or receiving wireless communication signals, blocks, frames, transmission streams, packets, messages and/or data. Types of antennas that may be used for antennas 107 may include, but are not limited to, internal antenna, dipole antenna, omni-directional antenna, a monopole antenna, an end fed antenna, a circularly polarized antenna, a micro-strip antenna, a diversity antenna, a phase array antenna and the like. Moreover, in some embodiments, antennas 107 may implement transmit and receive functionalities using separate transmit/receive antenna elements or may utilize integrated transmit/receive elements.

As depicted in FIG. 1, wireless communication device 102 may further comprise processor 114, input unit 118, output unit 116, memory unit 111, and storage unit 112. Processor 114 may include a Central Processing Unit (CPU), Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 is configured to execute instructions, such as, for example, instructions related to the Operating System (OS) of device 102, and/or of one or more suitable applications.

Input unit 118 of wireless communication device 102 may include, for example, a keyboard, a keypad, a mouse, a touch-pad, a track-ball, a stylus, a microphone, or other suitable pointing device or input device. Moreover, output unit 116 of wireless communication device 102 may include, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 111 of wireless communication device 102 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. And, storage unit 112 may include, for example, a hard disk drive, a floppy disk drive, a Compact Disk (CD) drive, a CD-ROM drive, a DVD drive, or other suitable removable or non-removable storage units. It will be appreciated that memory unit 111 and/or storage unit 112, may store data processed by wireless communication device 102.

Wireless communication device 102 may further include may include a camera 124 configured to capture image 139 from a field of view of camera 124. Camera 124 may include any suitable type of camera, for example, a built-in digital camera and the like, and may further include a forward-facing as well as a rearward-facing image capturing lens. Device 102 may also include a projector 123 configured to project reference pattern 138 on any suitable surface, e.g., floor, carpet, ceiling, user's body, etc. In some demonstrative embodiments, projector 123 may implement any suitable mechanism for projecting an image, such as, for example, a Light Electric Diode (LED) projector, laser projector, color projector, infrared projector, and the like.

In addition, wireless communication device 102 may include a location estimator 140 configured to estimate the location of device 102 based on raw location data parameters, as provided by one or more sensor elements 130. As illustrated by FIG. 1, sensor elements 130 may comprise one or more gyroscopic sensors 125, which may be configured to provide yaw, pitch, and roll orientation parameters of device 102; one or more accelerometer sensors 126, which may be configured to generate movement-related parameter information, such as, velocity and/or acceleration of device 102; and one or more magnetometer sensors 127, which may be configured to provide heading or compass direction parameter information of device 102. In some embodiments, a gyroscopic sensor 125 may be implemented without a magnetometer sensor 127 or vice versa. In other embodiments, the functionality of gyroscopic sensor 125 and magnetometer sensor 127 may be combined or integrated.

Accordingly, location estimator 140 may determine the estimated location of device 102 based on the velocity and velocity direction of device 102. For example, location estimator 140 may calculate a current location of device 102 based on a calculated distance and a calculated direction with respect to a previous location of device 102, e.g., provided by the GPS signals or provided by a previous calculation of the estimated location of device 102. To this end, location estimator 140 may incorporate an enhanced PDR module 201 or other similar techniques, as described in greater detail below.

Moreover, wireless communication device 102 may include an orientation estimator 132 configured to estimate the orientation of device 102 relative to a user's body and may further incorporate an orientation body change module 214, as discussed in greater detail below. That is, orientation estimator 132 may provide to location estimator 140 orientation change information, such as, yaw, pitch, and roll parameters related to the orientation between device 102 and the user's body. Location estimator 140 may then employ the orientation change information to account for orientation changes due to the handling of the device by the user as opposed to changes in trajectory.

With the operational architecture of wireless communication device 102, as described above, FIG. 2A provides a schematic functional block diagram of a rotation-tolerant scheme 200 to be implemented in wireless communication device 102, in accordance with various aspects and principles of the present disclosure. Scheme 200 enhances the conventional PDR technique by supplying updated orientation change information. As explained in greater detail below, scheme 200 utilizes the user's body as a reference to determine the orientation changes of wireless device 102 relative to the user's body as the user travels.

Figure 2A:
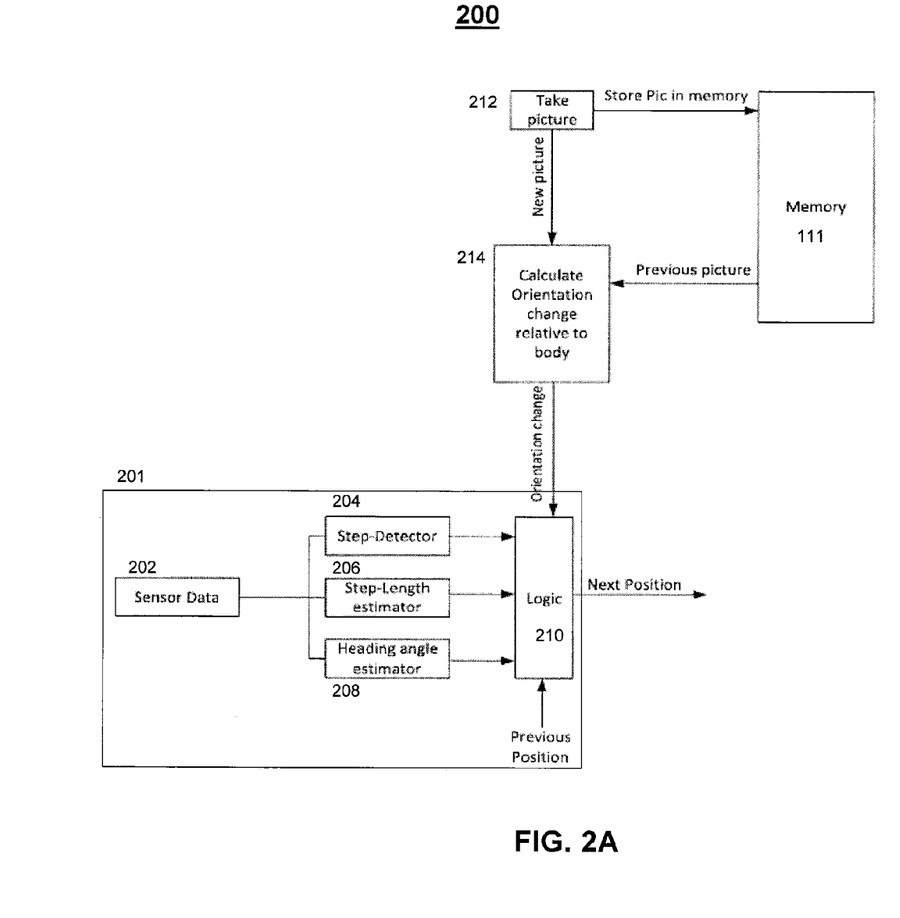
FIG. 2A depicts a schematic functional block diagram of a rotation tolerant scheme, in accordance with various aspects and principles of the present disclosure.

As depicted in FIG. 2A, enhanced PDR module 201, which may be implemented in location estimator 140 of device 102, allows for the input of orientation correction information and processes such correction information to account for orientation deviations due to the user's handling of device 102, as described in greater detail below. Enhanced PDR module 201 utilizes sensor information 202, as generated by gyroscopic sensors 125 which provide yaw, pitch, and roll orientation parameters of device 102, accelerometer sensors 126 which provide movement-related parameter information like velocity and/or acceleration of device 102, and magnetometer sensors 127, which provide heading or compass direction parameter information of device 102. Such sensor information 202 is supplied to step-detector module 204, step length estimator module 206, and heading angle estimator module 208. Step-detector module 204 utilizes accelerometer sensor 126 information to detect steps based on a predetermined threshold, step-length estimator module 206 utilizes user-specific calibration and accelerometer sensor 126 samples to estimate step or stride lengths, and heading angle estimator module 208 utilizes magnetometer sensor 127 and/or gyroscope sensor 125 measurements to estimate the direction of movement.

The information detected and/or estimated by step-detector module 204, step-length estimator module 206, heading angle estimator module 208 is supplied to logic 210 of enhanced PDR module 201, along with the previously calculated position.

Concurrently or in conjunction with, take picture module 212 of scheme 200 captures an image of the user holding wireless communication device 102 by employing the forward-facing functionality of camera 124. That is, at instant T1, forward-facing camera 124 takes a picture of the user's body. The captured image is stored in memory 111 of wireless communication device 102. After the passage of a predetermined interval (e.g., every 0.5 sec, 1.0 sec, etc.), at instant T2, forward-facing camera 124 takes a more current picture of the user's body. The previous image taken at T1 is retrieved from memory 111 and forwarded, along with along with the more current image taken at T2, to orientation body change module 214 which may be implemented in orientation estimator 132 of device 102.

Upon receiving the previous T1 image and current T2 image, orientation body change module 214 applies image processing techniques to determine rotational deviations in orientation relative to the user's body and forwards the information to enhanced PDR module 201. In an embodiment, an image processing technique that may be employed by orientation body change module 214 is to take the previous T1 image and provide multiple representations of the image (e.g., 180 copies) each rotated by a predetermined amount (e.g., 1 degree angle increments). Orientation body change module 214 may then compare the current T2 image with the multiple, angularly-shifted representations and deduce the rotational deviation in orientation relative to the user's body, based on the angular shift increment of the representation that most closely matches the current image.

Scheme 200 is progressively executed as the user continues to travel. In this regard, the current T2 image is subsequently stored in memory 111 and an even more current picture of the user's body is taken after the predetermined interval has lapsed, at instant T3. The T3 image is then compared by orientation body change module 214 to the multiple, angularly-shifted representations of the T2 image to determine the most current rotational deviation. The most current rotational deviation is then supplied to logic 210 of enhanced PDR module 201.

As noted above, the rotational deviation in orientation relative to the user's body, as deduced by orientation body change module 214 is supplied to logic 210 of enhanced PDR module 201. Armed with this information, logic 210 may correctly discriminate between orientation changes due the user's handling of device 102 and orientation changes that are due to legitimate changes in trajectory. Given this correction, along with the estimation information provided by step-detector module 204, step-length estimator module 206, heading angle estimator module 208 and the information regarding the previously calculated position, logic 210 may accurately estimate the current location of device 102.

Figure 2B:
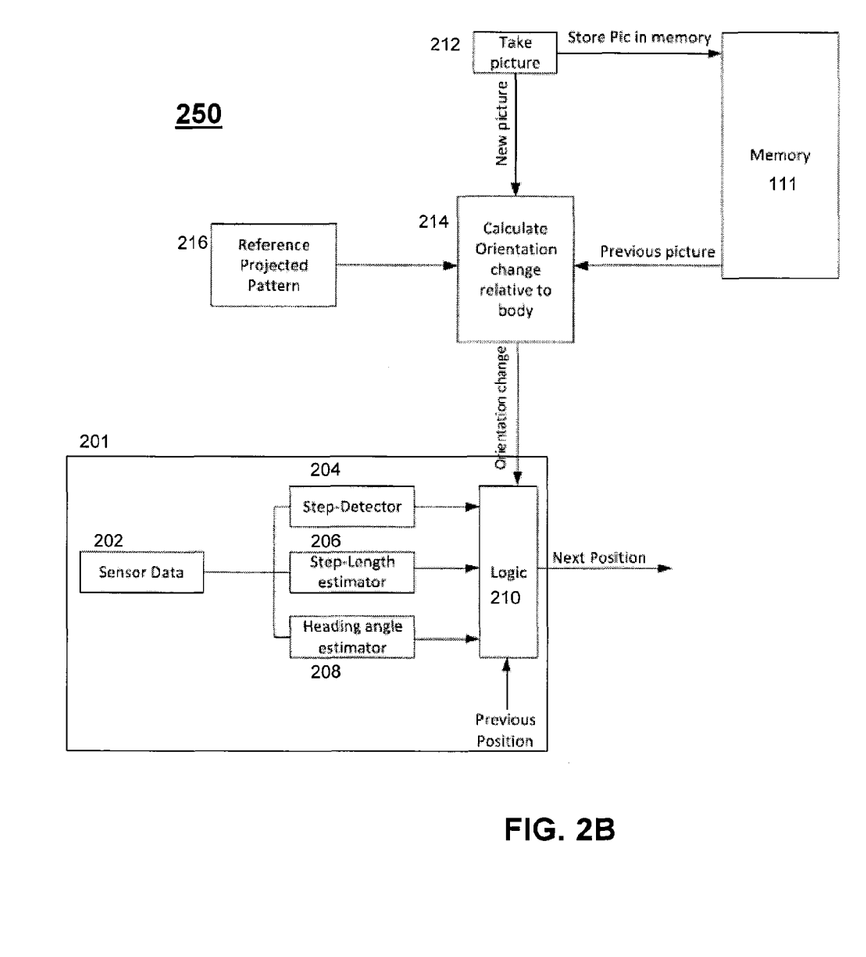
FIG. 2B depicts a schematic functional block diagram of a rotation tolerant scheme, in accordance with various aspects and principles of the present disclosure.

In a related embodiment, FIG. 2B provides a schematic functional block diagram of a rotation-tolerant scheme 250 to be implemented in wireless communication device 102, in accordance with various aspects and principles of the present disclosure. Like scheme 200, scheme 250 enhances the conventional PDR technique by supplying updated orientation change information that is attributable to the user's handling of device 102 as the user travels.

For the sake of tractability, the operations of the scheme 250 modules that are also shared by scheme 200 will not be exhaustively repeated, relying instead on brief descriptions.

In particular, like scheme 200, the information detected and/or estimated by step-detector module 204, step-length estimator module 206, heading angle estimator module 208 is supplied to logic 210 of enhanced PDR module 201, along with the previously calculated position. In addition, rotational deviation in orientation relative to the user's body is also supplied to logic 210 to provide orientation change corrections to logic 210.

However, instead of taking pictures of the user's body as the user handles device 102, scheme 250 first projects a reference pattern on the user's body using the projector 123 functionality of device 102. As noted above, projector 123 may employ any suitable mechanism for projecting an image, such as, for example, a Light Electric Diode (LED) projector, a laser projector, a color projector, etc.

Then, in scheme 250, forward-facing camera 124 takes a picture at instant T1 of the pattern projected on the user's body, which will be distorted due to the body surface. The captured T1 distorted image is stored in memory 111 of wireless communication device 102. After the passage of a predetermined interval (e.g., every 0.5 sec, 1.0 sec, etc.), at instant T2, forward-facing camera 124 takes a more current picture of the distorted pattern projected on the user's body. The previous distorted image taken at T1 is retrieved from memory 111 and forwarded to orientation body change module 214.

Figure 3A:
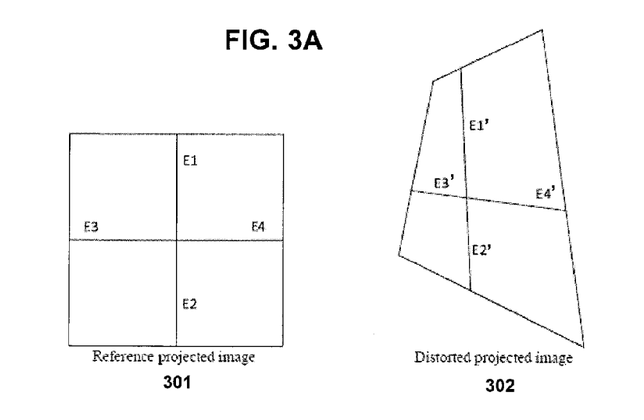
FIG. 3A depicts an original reference pattern and a distorted projected pattern, in accordance with various aspects and principles of the present disclosure.

Initially, orientation body change module 214 receives the original reference pattern from reference module 216 as well as the previous distorted T1 image. Orientation body change module 214 then determines orientation information of the previous distorted T1 image that represents the reference pattern projected on the user's body. In particular, as shown in FIG. 3A, the original reference pattern 301 may comprise a square with a cross in the middle having line segments E1, E2, E3, E4. It will be understood that the reference pattern is not limited to such a configuration, as other patterns and configurations may be applied with equal effectiveness.

As depicted in FIG. 3A, the length of line segment E1 is equal to the length of element E2 and, accordingly, a reference ratio between the lengths of elements E1 and E2 is one. Similarly, the length of element E3 is equal to the length of element E4 and, accordingly, a reference ratio between the lengths of elements E3 and E4 is also one.

However, the image of the pattern that is projected on the user's body (as captured by the previous distorted T1 image) 302, may comprise an irregular (i.e., non-square) quadrangle pattern having line segments E1', E2', E3', E4'. That is, projected pattern 302 may have distorted line segment E1' corresponding to line segment E1, distorted line segment E2' corresponding to line segment E2, distorted line segment E3' corresponding to line segment E3, and/or distorted line segment E4' corresponding to line segment E4.

Figure 3B:
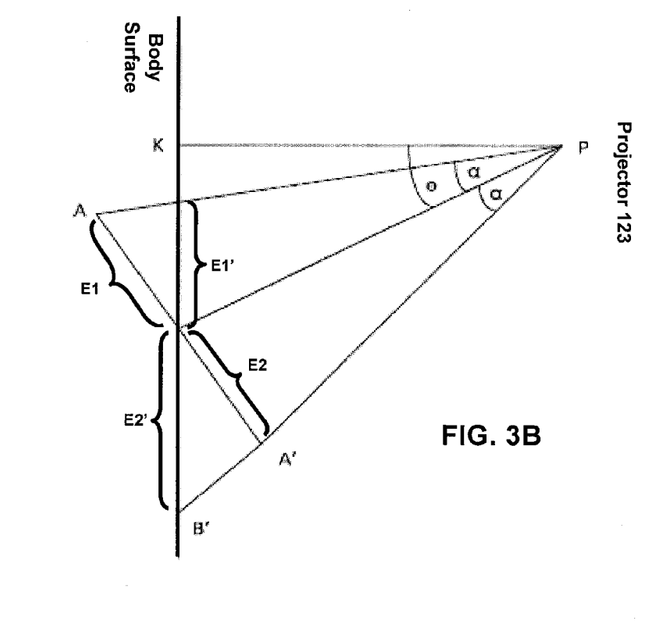
FIG. 3B depicts a two-dimensional geometric representation of the projected and distorted image, in accordance with various aspects and principles of the present disclosure.

By way of illustration, FIG. 3B depicts a two-dimensional geometric representation of the projected and distorted image. P refers to the position of projector 123 and body surface refers to the surface on which the image is projected on. The image is projected between line segments E1 and E2 and α denotes a predefined reference pitch angle corresponding to projector 123.

It will be appreciated that the pitch angle orientation and roll angle orientation of device 102 in respect to the users body may be determined based on the ratio between distorted line segment E1' and distorted line segment E2' and the ratio between distorted line segment E3' and distorted line segment E4', respectively. For example, orientation body change module 214 may determine the pitch angle orientation of device 102 in respect to the users body based on the ratio between distorted line segment E1' and distorted line segment E2' and determine the roll angle orientation of device 102 based on the ratio between distorted line segment E3' and distorted line segment E4'. In some embodiments, orientation body change module 214 may determine the pitch angle orientation of device 102, denoted $\theta_{pitch}$, based on the ratio between E1' and E2', in accordance with the following relationship:

$$\frac{E1'}{E2'} = \frac{\tan(\theta_{pitch}) - \tan(\theta_{pitch} - \alpha)}{\tan(\theta_{pitch} + \alpha) - \tan(\theta_{pitch})}$$

wherein, as noted above, α denotes a predefined reference pitch angle corresponding to the projected beam. For example, reference pitch angle α may be predefined based on the size of the light source of projector 123 and the vertical distance between the light source and the lens of projector 123.

In similar fashion, orientation body change module 214 may determine the roll angle orientation of device 102, denoted $\theta_{roll}$, based on the ratio between distorted line segment E3' and distorted line segment E4', in accordance with the following relationship:

$$\frac{E3'}{E4'} = \frac{\tan(\theta_{Roll}) - \tan(\theta_{Roll} - \beta)}{\tan(\theta_{Roll} + \beta) - \tan(\theta_{Roll})}$$

wherein β denotes a predefined reference roll angle corresponding to the projected beam. For example, reference roll angle β may be predefined based on the size of the light source of projector 123 and the horizontal distance between the light source and lens of projector 123.

Once orientation body change module 214 determines the pitch angle orientation relative to the user's body, $\theta_{pitch}(T1)$, of device 102 and the roll angle orientation relative to the user's body, $\theta_{roll}(T1)$, of device 102, based on the image of pattern 302 that is projected on the user's body as captured by the previous distorted T1 image, orientation body change module 214 establishes a baseline for $\theta_{pitch}(T1)$ and $\theta_{roll}(T1)$ of device 102 in scheme 250. Armed with the $\theta_{pitch}(T1)$ and $\theta_{roll}(T1)$ baselines, orientation body change module 214 then calculates $\theta_{pitch}(T2)$ and $\theta_{roll}(T2)$ from the more current picture of the distorted pattern projected on the user's body taken at instant T2. Finally, the change in orientation related to the users body is defined by the differences $\theta_{pitch}(T1)-\theta_{pitch}(T2)$ and $\theta_{roll}(T1)-\theta_{roll}(T2)$. These rotational deviations in orientation relative to the user's body between the two images are forwarded to logic 210 of enhanced PDR module 201.

These rotational deviations in orientation relative to the user's body enables logic 210 to correctly discriminate between orientation changes due the user's handling of device 102 and orientation changes that are due to legitimate changes in trajectory. Given this correction, along with the estimation information provided by step-detector module 204, step-length estimator module 206, heading angle estimator module 208 and the information regarding the previously calculated position, logic 210 may accurately estimate the current location of device 102.

In this manner, rotation-tolerant schemes to be implemented by wireless communication devices are presented that account for the user's handling of such devices as the user travels and relies on navigation and location guidance.

Having thus described the basic concepts, it will be rather apparent to those skilled in the art after reading this detailed disclosure that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure. In addition, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a micro-controller, or the like.

Furthermore, the recited order of processing elements or sequences, or the use of numbers, letters, or other designations therefore, is not intended to limit the claimed processes and methods to any order except as can be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, as the following claims reflect, inventive embodiments lie in less than all features of a single foregoing disclosed embodiment. Thus, the claims following the detailed description are hereby expressly incorporated into this detailed description.

What is claimed is:

1. A wireless communication device, comprising:
a plurality of sensor elements configured to provide orientation parameter information, velocity and/or acceleration parameter information, and directional heading parameter information;
a camera mechanism configured to capture images at predetermined intervals of a user's body as the user handles the wireless communication device;
orientation logic configured to determine orientation change information relative to the user's body attributable to the user's handling, based on the captured images of the user's body, and provide orientation correction information; and
location estimation logic configured to provide current location information based on previous location information, the velocity and/or acceleration parameter information, the directional heading parameter information and/or the orientation parameter information, and the orientation correction information.

2. The wireless communication device of claim 1, wherein the orientation logic includes an orientation module configured to apply image processing to a previously captured image and compare to a currently captured image to determine orientation change information relative to the user's body and the orientation correction information.

3. The wireless communication device of claim 2, wherein the orientation module generates multiple representations of the previously captured image rotated at predetermined angular increments, compares the multiple representations with the currently captured image, determines rotational deviations based on one of the representation that best matches the currently captured image, and supplies orientation correction information based on the determined rotational deviations.

4. The wireless communication device of claim 1, wherein the location estimation logic includes an enhanced Pedestrian-Dead-Reckoning (PDR) module configured to receive the orientation correction information from the orientation module and process the orientation correction information to account for orientation changes relative to the user's body in determining current location information.

5. The wireless communication device of claim 2, further comprising a projector mechanism configured to project a pattern onto the user's body, wherein the camera mechanism captures images of the projected pattern on the user's body.

6. The wireless communication device of claim 5, wherein the orientation module determines pitch angle and roll angle orientation relative to the user's body based on the previously captured image, determines pitch angle and roll angle orientation relative to the user's body based on the currently captured image, determines orientation changes based on pitch angle differences between the previously captured image and the currently captured image, determines orientation changes based on roll angle differences between the previously captured image and the currently captured image to determine orientation change information relative to the user's body.

7. The wireless communication device of claim 1, wherein the sensor elements include one or more accelerometer sensors.

8. The wireless communication device of claim 1, wherein the sensor elements include one or more gyroscopic sensors.

9. The wireless communication device of claim 1, wherein the sensor elements include one or more magnetometer sensors.

10. The wireless communication device of claim 1, wherein the camera mechanism is configured to capture images in a face-forward mode.

11. The wireless communication device of claim 2, further comprising a memory element to store the previously captured images.

12. The wireless communication device of claim 5, wherein the projector mechanism comprises at least one or more of the following: light emitting diode (LED) projector, laser projector, color projector, and/or infrared projector.

13. The wireless communication device of claim 1, wherein the current location information is within an indoor environment.

14. A method of determining current location information in a wireless device, comprising:
- determining, via sensor elements, orientation parameter information, velocity and/or acceleration parameter information, and directional heading parameter information;
- capturing images at predetermined intervals of a user's body as the user handles the wireless communication device;
- determining orientation change information relative to the user's body attributable to the user's handling, based on the captured images of the user's body;
- providing orientation correction information based on the orientation change information; and
- providing the current location information based on previous location information, the velocity and/or acceleration parameter information, the directional heading parameter information and/or the orientation parameter information, and the orientation correction information.

15. The method of claim 14, wherein the determining of orientation change information and orientation correction information includes applying image processing to a previously captured image and comparing to a currently captured image to determine orientation change information relative to the user's body and the orientation correction information.

16. The method of claim 15, wherein the image processing includes generating multiple representations of the previously captured image rotated at predetermined angular increments, comparing the multiple representations with the currently captured image, determining rotational deviations based on one of the representation that best matches the currently captured image, and supplying orientation correction information based on the determined rotational deviations.

17. The method of claim 14, wherein the providing of the current location information includes receiving the orientation correction information and processing the orientation correction information to account for orientation changes relative to the user's body in determining current location information.

18. The method of claim 15, further comprising projecting a pattern onto the user's body, wherein the capturing of images includes capturing projected pattern on the user's body.

19. The method of claim 18, wherein the image processing includes determining pitch angle and roll angle orientation relative to the user's body based on the previously captured image, determining pitch angle and roll angle orientation relative to the user's body based on the currently captured image, determining orientation changes based on pitch angle differences between the previously captured image and the currently captured image, determining orientation changes based on roll angle differences between the previously captured image and the currently captured image to determine orientation change information relative to the user's body.

20. The method of claim 14, wherein the current location information is within an indoor environment.

* * * * *